United States Patent [19]

Sommer

[11] 4,223,774

[45] Sep. 23, 1980

[54] CLUTCH UNIT

[75] Inventor: Gordon M. Sommer, Grosse Pointe Farms, Mich.

[73] Assignee: G. M. Sommer Company, Inc., Warren, Mich.

[21] Appl. No.: 849,858

[22] Filed: Nov. 9, 1977

[51] Int. Cl.² ............... F16D 25/063; F16D 13/68; F16D 13/72

[52] U.S. Cl. .................. 192/85 AA; 188/73.6; 192/70.13; 192/85 R; 192/86; 192/113 B

[58] Field of Search ............... 192/70.13, 85 AA, 86, 192/85 R, 113 B; 188/73.6, 366

[56] References Cited

U.S. PATENT DOCUMENTS

| | | | |
|---|---|---|---|
| 1,472,930 | 11/1923 | Mayer | 192/86 X |
| 2,833,385 | 5/1958 | Peterson et al. | 192/113 B |
| 3,007,562 | 11/1961 | Aschauer | 192/86 X |
| 3,155,040 | 11/1964 | Shurts et al. | 192/85 R X |
| 3,360,087 | 12/1967 | Hilpert | 192/113 B X |
| 3,403,763 | 10/1968 | Hilpert et al. | 192/85 AA X |
| 3,680,666 | 8/1972 | Sommer | 188/170 |
| 3,696,898 | 10/1972 | Sommer | 192/18 A |
| 3,713,517 | 1/1973 | Sommer | 192/18 A |
| 3,722,645 | 3/1973 | Sommer | 192/70.13 |

Primary Examiner—Allan D. Herrmann
Attorney, Agent, or Firm—Harness, Dickey & Pierce

[57] ABSTRACT

A clutch unit especially adapted for accurately controlling the transmission of high rotary forces with minimum residual drag. A servo control valve supplied with hydraulic fluid by a pump controls a first stage fluid amplifier supplied by a separate pump, this amplifier in turn controlling a second stage amplifier supplied by a third pump. The second stage amplifier supplies main and auxiliary inlet ports of the clutch unit. The oil shear type clutch has a plurality of interleaved plates and discs. Separate piston and cylinder means are provided for actuating the plates for each clutch disc by means of the main fluid supply, the pressure of which is varied in accordance with input signals to the servo control valve. The auxiliary supply to the clutch acts both to retract the piston and cylinder means, thus separating the plates and discs with a minimum of residual drag, and as a cooling medium. The clutch discs are segmented so as to permit economical fabrication in spite of the large size of the clutch, with the disc segments being mounted so as to permit convenient replacement without requiring complete disassembly of the unit.

14 Claims, 8 Drawing Figures

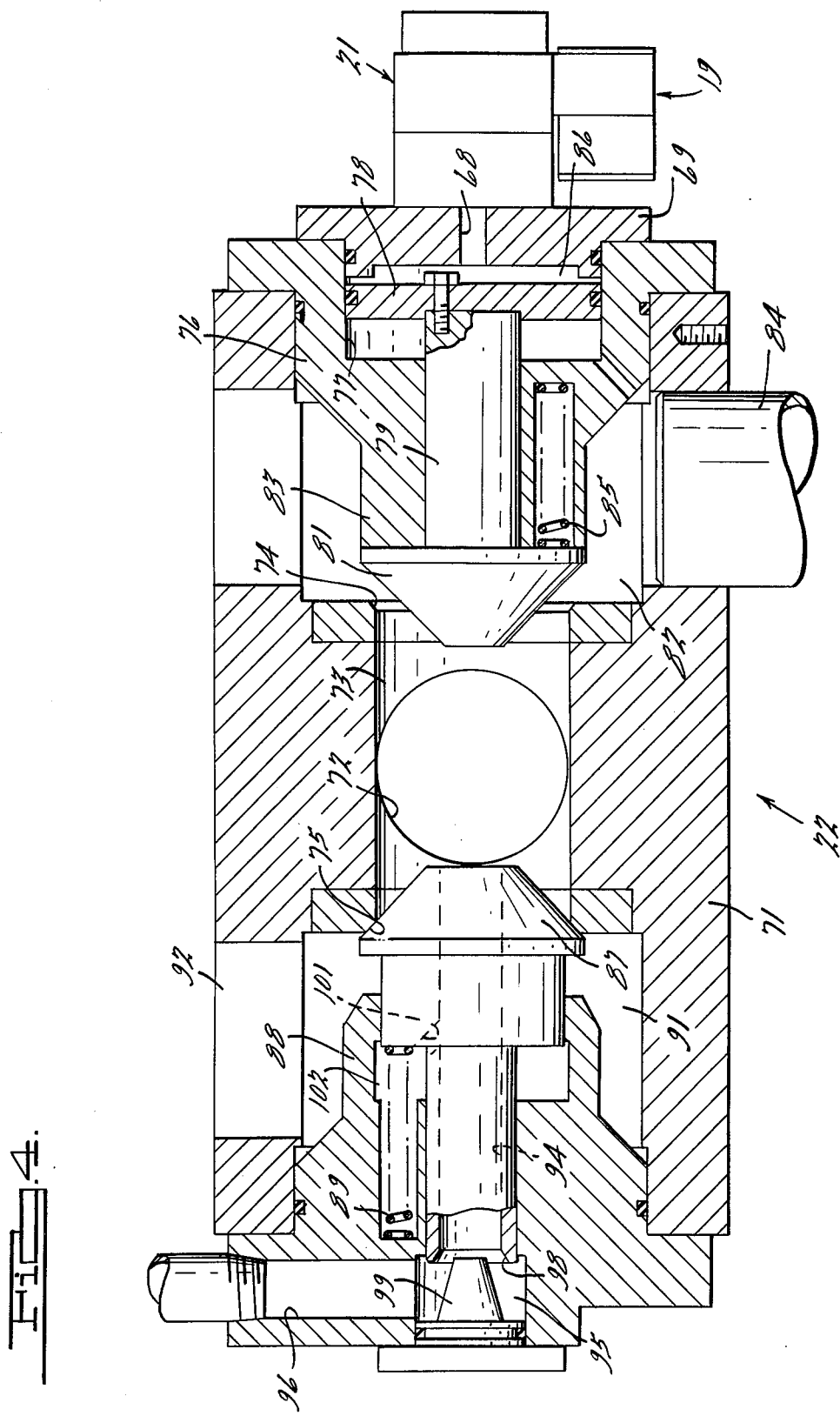

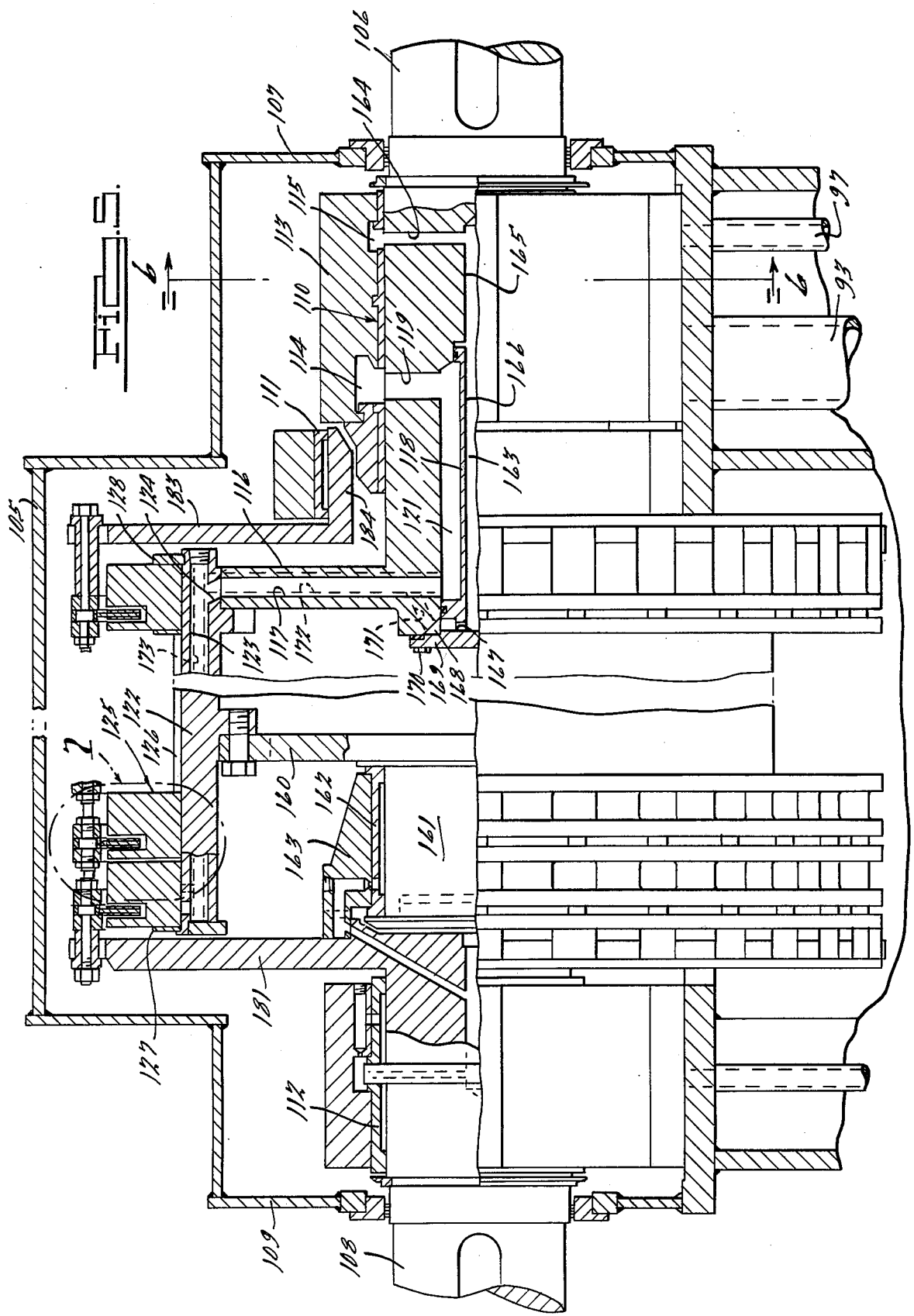

CLUTCH UNIT

BACKGROUND OF THE INVENTION

1. Field of the Invention

The invention relates to clutch units of the oil shear type, and particularly to units having interleaved clutch plates and discs which are alternately clamped together or separated in an axial direction. The invention is directed toward a very large size clutch unit such as would be found in an aircraft catapult system for selectively winding or tensioning a nylon belt or tape which is in turn connected to a carriage secured to the aircraft to be launched or catapulted.

2. Description of the Prior Art

My U.S. Pat. No. 3,696,898 issued Oct. 10, 1972 shows a clutch-brake unit in which a plurality of interleaved clutch discs and plates are provided, all of which are simultaneously actuated by a single piston. The arrangements shown in this patent would be unsatisfactory for the purpose of actuating large size clutch units which must transmit high horsepowers. Among the problems to be dealt with in the construction of large size oil shear type clutch units are the need for maximum application of forces to couple the plates and discs, the cooling requirements for the parts, and most importantly, the need for minimizing residual drag. To illustrate the magnitude of residual drag problems, it should be noted that in an 85,000 horsepower clutch operating at 1200 R.P.M., the residual drag is in the order of 8-10,000 horsepower. The residual drag in the apparatus of the present invention, on the other hand, is less than 500 horsepower.

BRIEF SUMMARY OF THE INVENTION

It is an object of the present invention to provide a novel and improved clutch unit which overcomes the disadvantages of previously known constructions, especially when applied to large size power transmission requirements.

It is another object to provide an improved oil shear type clutch unit of this nature which is capable of applying strong coupling forces between the plates and discs while still maintaining high control accuracy in accordance with various input conditions.

It is a further object to provide a novel and improved clutch unit of this nature which utilizes hydraulic fluid for the dual purpose of retracting the plate actuating means to reduce residual drag, and as a coolant for the clutch discs.

It is also an object to provide an improved clutch unit of this character in which replacement of portions of the clutch discs may be effected without requiring complete disassembly of the unit.

Briefly, the clutch unit of this invention comprises an input shaft, an output shaft, a plurality of clutch plates connected to one of said shafts, a plurality of clutch discs interleaved between said clutch plates and connected to the other shaft, and separate means for closing the gap between each clutch disc and its adjacent clutch plates, said means comprising piston and cylinder means connected to said clutch plates on opposite sides of each clutch disc, and fluid pressure control means for simultaneously supplying pressurized fluid in parallel to all of said piston and cylinder means. As will hereinafter be described, the provision of the separate piston for each of the disc segments minimizes residual drag of the unit. Auxiliary fluid pressure control means are provided for said piston and cylinder means acting in a direction opposite to said first-mentioned fluid pressure control means for urging said clutch plates to retract from said clutch discs. Conduit means are further provided for said auxiliary fluid pressure control means leading from said piston and cylinder means to the vicinity of an adjacent clutch disc whereby said auxiliary fluid will act as a coolant.

In another aspect, the clutch unit comprises an input shaft, an output shaft, a plurality of clutch discs connected to one of said shafts, a plurality of clutch plates interleaved with said discs and connected to the other shaft, said clutch discs extending outwardly from said clutch plates, each of said clutch discs comprising a plurality of arcuate segments in a circumferential arrangement, longitudinally extending supporting means for clutch disc segments, coacting portions on said supporting means and the edges of said clutch disc segments for holding the segments in position, and removable fastener means for holding said supporting means in position, whereby removal of said fastener means will permit one or more segments to be separately removed from said clutch unit without disturbing the other segments. It is to be noted that clutch discs of the type utilized herein are traditionally manufactured through the use of relatively small size retort equipment, and that such equipment is not readily available for use in fabricating large diameter clutch components. Consequently, by utilizing relatively smaller size clutch disc segments, the conventional retort equipment may be employed.

In still another aspect, the invention comprises an oil shear type clutch having interleaved clutch plates and clutch discs, each of said clutch discs comprising a plurality of arcuate segments in a circumferential arrangement, shafts for said plates and discs, and means mounting said segments on their shaft whereby said segments are separately removable.

BRIEF DESCRIPTION OF THE DRAWINGS

FIG. 4 is a cross-sectional view of the second stage amplifier;

FIG. 5 is a partially sectioned side elevational view of the clutch unit;

FIG. 6 is a cross-sectional view in elevation taken along the line 6—6 of FIG. 5 and showing the input shaft, a bearing, and the housing;

DESCRIPTION OF THE PREFERRED EMBODIMENT

Figure 1:
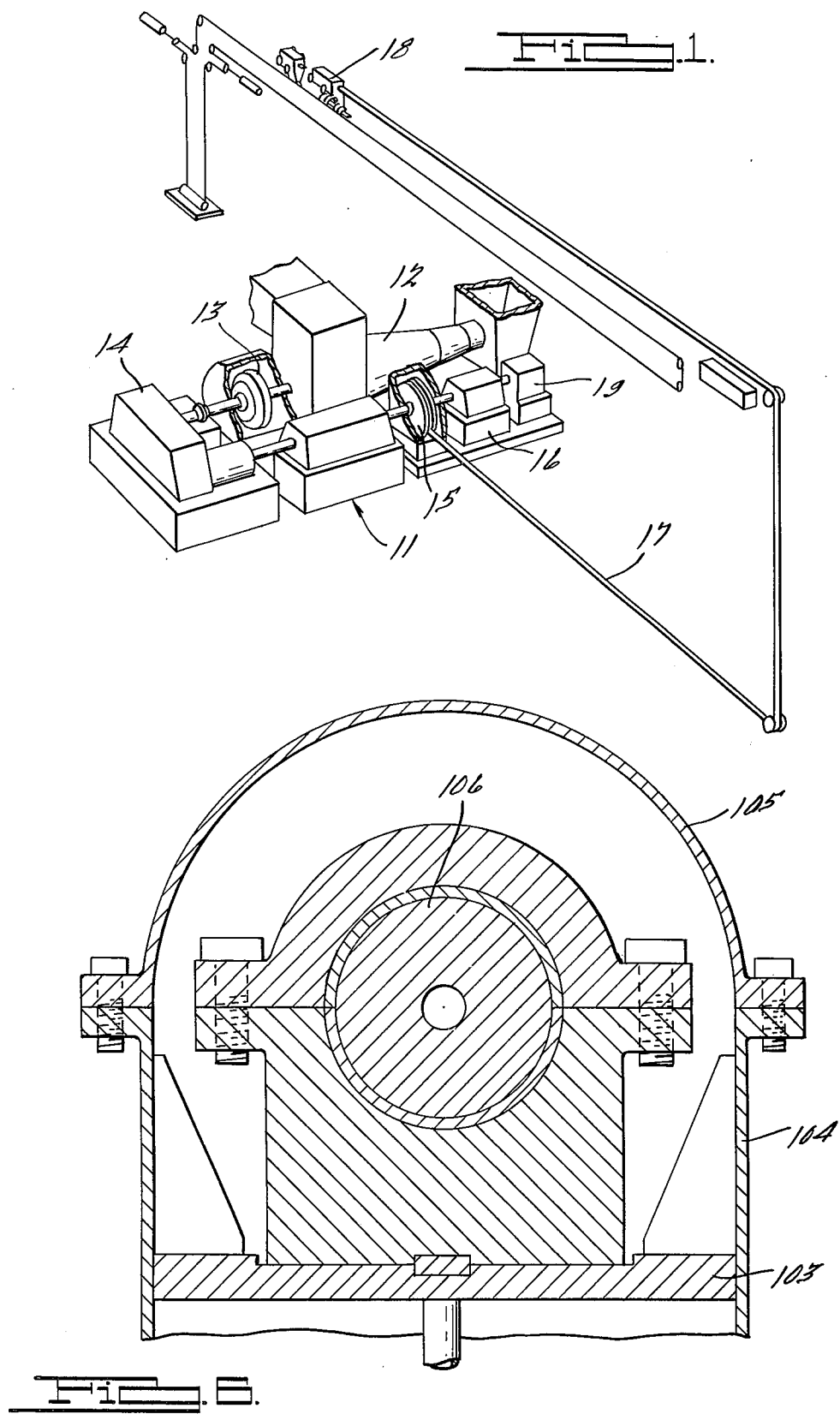
FIG. 1 is a schematic perspective view of a stored energy rotary drive aircraft catapult with which the present invention is associated.

The clutch unit of this invention is shown generally at 11 in FIG. 1 as part of a stored energy rotary drive catapult, for example, one which would be used in an aircraft catapult system. Such a system has a prime mover such as a turbine 12 having a flywheel 13 and connected through reduction gearing 14 to drive clutch unit 11. The output shaft of drive clutch 11 is connected to a tape reel 15, the other side of this tape reel being connected to a reel brake 16 which does not form part of the present invention. The tape reel is used for selectively winding or tensioning a nylon belt or tape 17 which in turn is connected to a carriage 18 secured to the aircraft to be launched or catapulted. An advanced motor 19 is provided for returning carriage 18 to its starting position.

Figure 2:
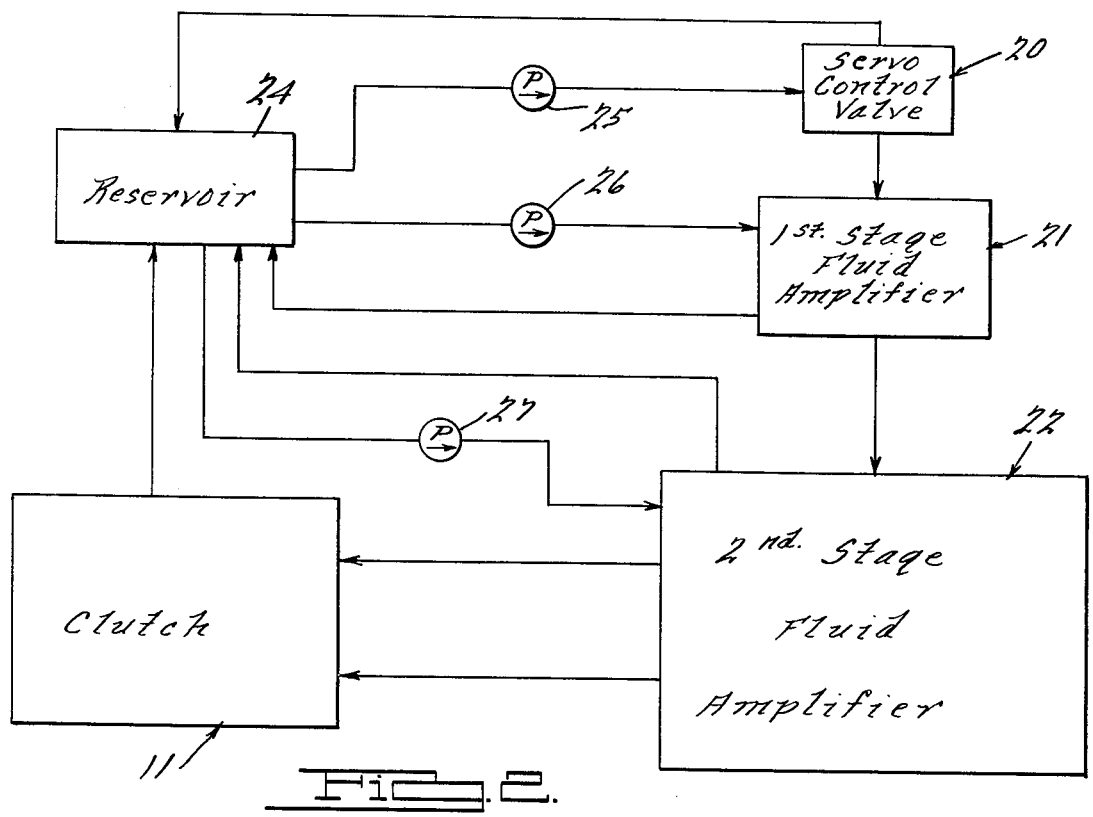
FIG. 2 is a block diagram showing the components of the system for controlling the clutch unit.

The clutch operating system is shown schematically in FIG. 2 and comprises a servo control valve generally indicated at 20, a first stage fluid amplifier generally indicated at 21, a second stage fluid amplifier generally indicated at 22, and clutch unit 11. A reservoir 24 is shown in FIG. 2 and is adapted to supply fluid to three pumps, 25, 26 and 27 for servo control valve 20, first stage amplifier 21, and second stage amplifier 22 respectively. It has been found that three separate flows are necessary from the three separate pumps 25, 26 and 27 in view of the fact that each flow requires a different flow rate and pressure.

Figure 3:
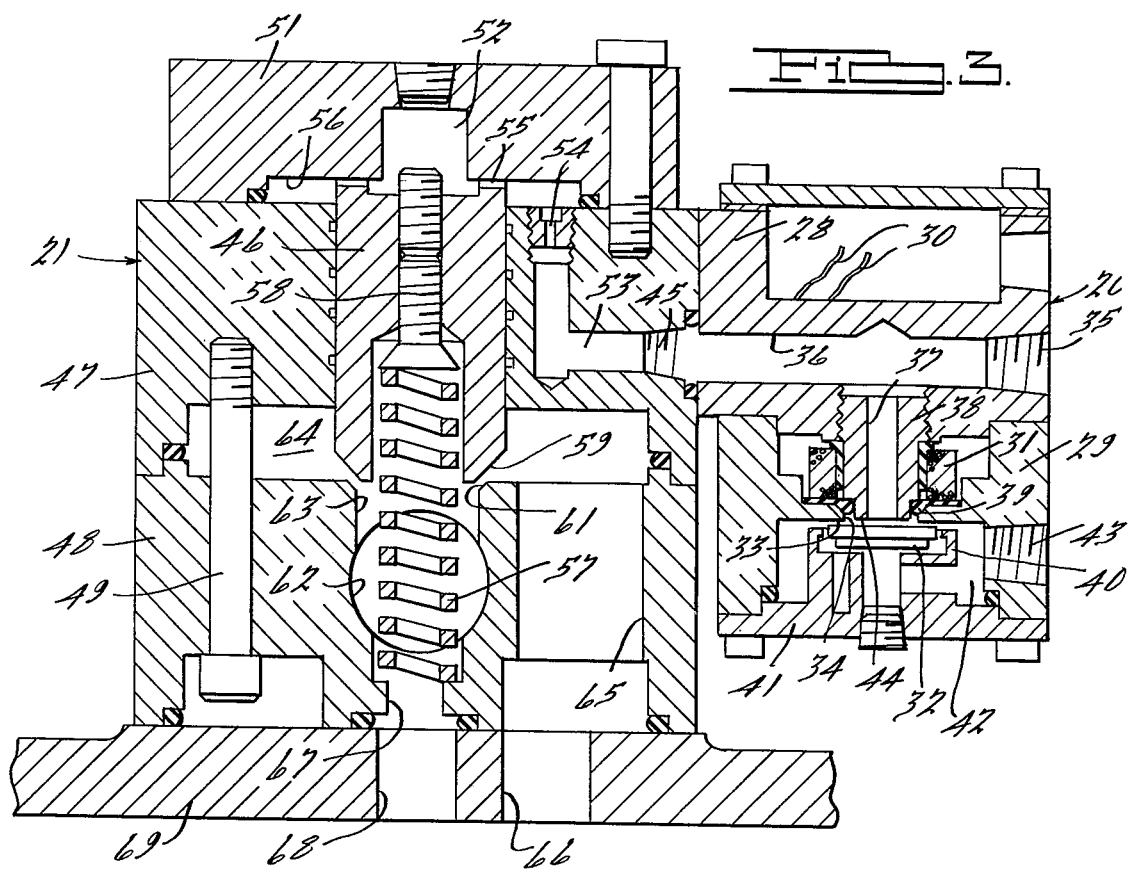
FIG. 3 is a cross-sectional view of the servo control valve and first stage amplifier.

The purpose of the servo control valve is to provide extremely accurate fluid pressure control in response to various conditions. For example, in the case of a catapult system, the torque output of the clutch must be profiled in accordance with wind and temperature conditions as well as the type of aircraft being launched. The servo valve 20 is shown more specifically in FIG. 3 and is of the same general type shown and described in my U.S. Pat. No. 3,851,742 issued Dec. 3, 1974. The servo control valve has a main body 28 and a coil housing 29. Coil leads 30 extend into main body 28 and are connected to a 12-volt d.c. coil 31 in coil housing 29. This coil controls the movement of a disc 32 which faces a valve seat 44 (hereinafter to be described) and is drawn toward said valve seat with a force depending upon the current passing to the coil. Pump 25 is connected to an inlet port 35 in main body 27, and a passage 36 extends through body 27 from this port. A passage 37 leads at right angles from passage 36 through coil 31 to disc 32, the member 38 in which passage 37 is formed extends through opening 34 and is sealingly connected thereto by an O-ring 39. The disc 32 is held by a guide 40 formed as a part of an end body 41 and disposed in a chamber 42 of coil housing 29, and an outlet port 43 is connected to this chamber. The position of disc 32 with respect to the valve seat 44 formed at the end of passage 37 thus controls the fluid flow from inlet port 35 to outlet port 43 which is connected to reservoir 23.

The end of passage 36 opposite inlet port 35 is connected to a signal port 45 formed in first stage amplifier 21. A piston 46 is slidably mounted in the first stage amplifier which is made up of two body sections 47 and 48 secured together by bolts 49. Piston 46 faces an end cap 51 on the first stage amplifier and forms therewith a chamber 52. This chamber is connected with port 45 by a passage 53, a restriction 54 and recessed portions 55 on piston 46 which engage a shoulder 56 on end cap 51.

A helical coil compression spring 57 is mounted in body section 48 of the first stage amplifier and engages an adjustable member 58 carried by piston 46, urging the piston against shoulder 56. A valve 59 is formed on the end of piston 46 opposite that which engages shoulder 56. This valve is tapered and co-acts with a correspondingly tapered valve seat 61 on body section 48. An inlet port 62 is formed in body section 48 of the first stage amplifier and is connected with the outlet of pump 26. A passage 63 leads from inlet port 62 to valve seat 61. According to the amount of pressure in chamber 52, piston 46 will close to a greater or lesser extent the gap between its valve 59 and valve seat 61, thus controlling the pressure of the fluid communicated via the inlet port 68. Valve seat 61 leads to a chamber 64 which in turn has a passage 65 leading to an outlet port 66 which is connected to the reservoir 23. Another passage 67 leads from inlet port 62 in the opposite direction from passage 63. Passage 67 leads to a passage 68 in the oil manifold 69 of second stage amplifier 22. Thus, the amount of pressure delivered to the signal port of the second stage amplifier will be controlled by the position of piston 46 which is in turn controlled by the position of disc 32.

The construction of second stage amplifier 22 is shown in FIG. 4 which also indicates the manner in which the servo control valve and first stage amplifier are connected thereto. The second stage amplifier comprises an elongated body 71 having an inlet port 72 at its midportion and extending transversely thereto into a central chamber 73. Inlet port 72 is supplied by pump 27, and passage 73 has a pair of tapered valve seats 74 and 75 at its opposite ends and facing in opposite directions. An end member 76 is mounted in housing 71 and has a cylinder 77 formed therein. A piston 78 is slidably mounted in this cylinder and is secured to one end of a piston rod 79 slidably mounted in member 76. The other end of this piston rod carries a valve 81 which co-acts with valve seat 74 to control the amount of fluid flowing from passage 73 into a chamber 82 which surrounds a reduced portion 83 of end member 76. An outlet port 84 leads from chamber 82 to reservoir 23. A plurality of springs 85 urge valve 81 in a direction closing the space between seat 74 and valve 81. Signal port 68 is connected to a chamber 86 formed by piston 78 and oil manifold 69, and pressure in this chamber will move valve 81 along with the action of springs 85 to restrict the passage to valve seat 74.

A valve 87 is disposed adjacent valve seat 75 and is guided for axial movement by an end member 88 in body 71. The valve is held normally closed by a plurality of compression springs 89 disposed in bores within member 88. However, when the pressure within chamber 73 reaches a predetermined magnitude, valve 87 will be lifted from seat 75 to permit fluid to pass through the valve seat.

Valve seat 75 leads to a chamber 91 which has an outlet port 92 connected to an inlet passage 93 (FIG. 5) for the clutch unit. Passage 93 constitutes the main fluid supply connection for the clutch unit and, as will be later described, supplies fluid which simultaneously actuates all the clutch plate piston and cylinder means in a coupling direction. An axial bore 94 in valve 87 leads to a chamber 95 within end member 88. An outlet port 96 leads from chamber 95 to a passage 97 in the clutch unit (FIG. 5). Passage 97 constitutes a auxiliary fluid supply for the clutch unit, the fluid in this passage exerting constant retracting pressure on the clutch plate piston and cylinder means as well as serving a cooling function for the clutch discs. A tapered seat 98 is provided in the end passage 94 which co-acts with a complementary adjustable valve 99. The position of valve 99 may be preselected to determine the flow rate and pressure to the auxiliary passage 97. A side passage 101 leads from passage 94 to a chamber 102 on the side of valve 87 opposite that which faces chamber 73. The pressure in chamber 102 aids springs 89, but the area on which the pressure in chamber 102 acts is less than that on which the fluid in chamber 73 acts in a valve opening direction.

FIGS. 5-8 shows the construction of clutch unit 11. The clutch unit comprises a base 103, a lower housing 104 (which is preferably formed integrally with base 103), and a domed upper housing 105. An input shaft 106 extends through an end plate 107 at one end of the housing and an output shaft 108 extends through an end plate 109 at the other end. Input shaft 106 is supported by a hydrodynamic bearing 110 and by a hydrostatic bearing 162 hereinafter to be described. Output shaft 108 is rotatably supported by hydrostatic bearings 111 and 112 which have separate oil supplies.

A housing 113 surrounds bearing 110 so as to journal support the adjacent end of the input shaft 106. The housing 113 defines an annular chamber 114 which is supplied by main fluid inlet passage 93. A second and smaller annular chamber 115 in housing 113 is supplied by auxiliary fluid passage 97. It should be noted that the bearing 110 acts as a rotary fluid seal between the chambers 114 and 115.

A radially outwardly extending portion 116 is formed on the end of input shaft 106 within housing 104, 105 and has a plurality of radial passages 117. An annular member 118 is disposed within a bore in shaft 106 and extends between chamber 114 and passages 117. A plurality of inwardly extending radial passages 119 extend from annular chamber 114 and are connected to the axially extending chamber 121 formed by member 118 and shaft 106. Thus, the main fluid flow will be led radially outwardly by passages 117. It should be noted that input shaft 106 with portions 116, members 122 and 161 (hereinafter described), form a unitized input shaft assembly.

An annular member 122 is provided and extends axially from the outer edge of input shaft portion 116. A plurality of circumferentially spaced axially extending passages 123 are formed in member 122. One end of each passage 123 is connected to a corresponding radial passage 117 by a short connecting passage 124.

A plurality of annular clutch plate assemblies generally indicated at 125 are secured in axially adjacent relation to the outside of member 122. The assemblies are held in position by key 126 on member 122 so as to prevent relative rotation, and are held against endwise movement by annular members 127 and 128 carried by the ends of member 122. The construction of each assembly 125 is shown in detail in FIGS. 7 and 8. The clutch assembly comprises an inner member 129 mounted on key 126 and having fitting spacers 131 at opposite ends which maintain proper spacing with respect to the adjacent assemblies 125. One portion of member 129 is provided with splines 132. A first annular clutch plate 133 of L-shaped cross section has splines 134 interfitting with splines 132. The main radially extending portion of clutch plate 133 has a heat treated surface 135 engageable with one side 136 of a series of segmented annular clutch discs 137 which are described in detail below. A piston 138 is threadably mounted at 139 on the portion of clutch plate 133 which carries splines 132. The piston is slidably mounted within a cylinder 141 which has a first radially extending portion 142 slidably connected by splines 143 to splines 132. A second axially extending portion 144 of member 142 has a second annular clutch plate 145 secured thereto by a plurality of circumferentially spaced bolts 146. Clutch plate 145 has a heat-treated surface 147 engageable with the other side 148 of clutch disc segments 137.

Fluid passage means are provided for leading the pressurized fluid from passage 123 to the chamber 149 which is formed between clutch plate 145 and piston 138. A seal 151 is carried by the axially extending portion of clutch plate 133 and engages a facing surface on clutch plate 145, and a seal 152 carried by piston 138 engages cylinder 141, these two seals forming the closed chamber 149. The passage means comprises a radial passage 153 leading from passage 123 to a passage 154 in member 129. A passage 155 in the axially extending portion of clutch plate 133 leads from passage 154 to chamber 149. Passages 157 are formed in the piston 138 to provide fluid flow between passage 155 and the interior of the chamber 149. A plurality of control orifices 158 extend through the axially extending portion of clutch plate 133 to the space 159 in the vicinity of clutch disc segments 137. These control orifices lead from passage 154 and are for cooling fluid to the clutch disc segments.

A radial plate 160 is secured to the inside of member 122, and a bearing support section 161 is secured to the central portion of plate 160 and carries the aforementioned hydrostatic bearing 162. This bearing permits the extension 163 secured to the inner end of output shaft 108 to journal support section 161 and hence rotatably support inner end of the shaft 106.

Annular chamber 115 for the auxiliary fluid feeds a radially inwardly extending passage 164 in shaft 106 which leads to an axial passage 165. The auxiliary fluid will flow from this passage through a central passage 166 in member 118 to radial slots 167. This passage leads to an annular chamber 168 formed between an end flange member 169 mounted on member 118, and a chamber on shaft portion 116. Flange 169 is secured by bolts 170 to shaft portion 116. Passages 171 lead from chamber 168 to radial passages 172 in shaft portion 116 between passages 117.

Passages 172 lead to a plurality of axial passages 173 disposed between passages 123 in member 122. A radial passage 174 leads from each passage 173 to an annular chamber 175 in each member 129. Chamber 175 is located alongside chamber 154 but is of somewhat small cross-sectional area. One or more restricted passages 176 lead from chamber 175 to cylinder chamber 141. Pressure in chamber 141 caused by the centrifugal force of the oil within the unit will tend to move clutch plates 133 and 145 away from clutch disc segments 137. The auxiliary fluid will thus serve the function of constantly and positively urging retraction of the clutch plates, so that when pressure is relieved in chamber 149, the clutch plates will be entirely separate from the clutch discs to reduce residual drag to a minimum.

A passageway 177 leads from each chamber 141 through member 142 to an extension 178 loosely interfitting with a recess 179 in the adjacent clutch plate 133. A passage 180 leads from chamber 179 through clutch plate 133 to the space 159 surrounding disc segments 137. The auxiliary fluid will thus serve the additional function of cooling the clutch discs both during the operation of the unit and when the clutch is disengaged.

An outwardly radial portion 181 is formed on output shaft 108 between bearings 112 and 162. Portion 181 is located at one end of the stack of clutch plates and discs. A member 183 is disposed at the other end of the stack and extends radially inwardly, the inner end 184 of this member extending axially and being supported by bearings 111.

Figure 7:
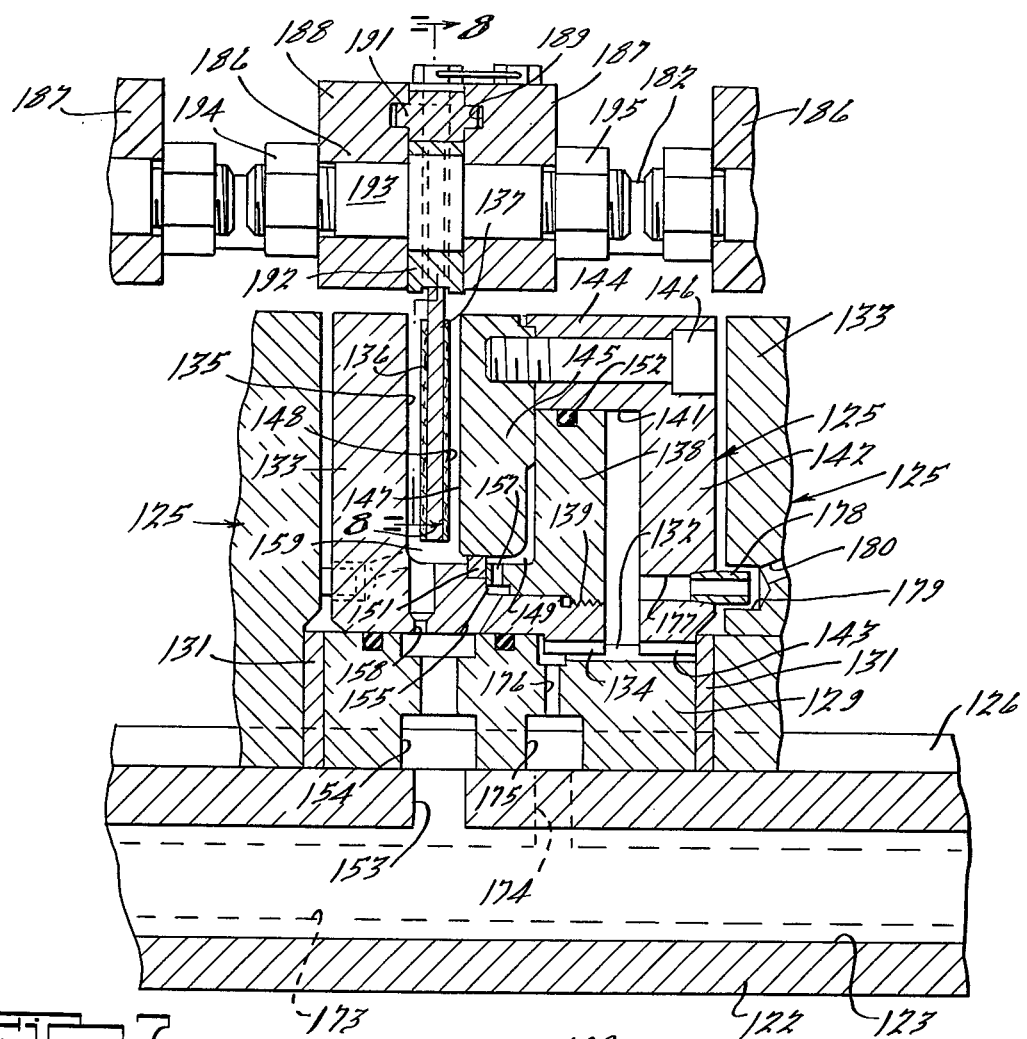
FIG. 7 is an enlarged cross-sectional view in elevation taken in the area marked 7 of FIG. 5 and showing the construction of the piston and cylinder means for a pair of clutch plates.
Figure 8:
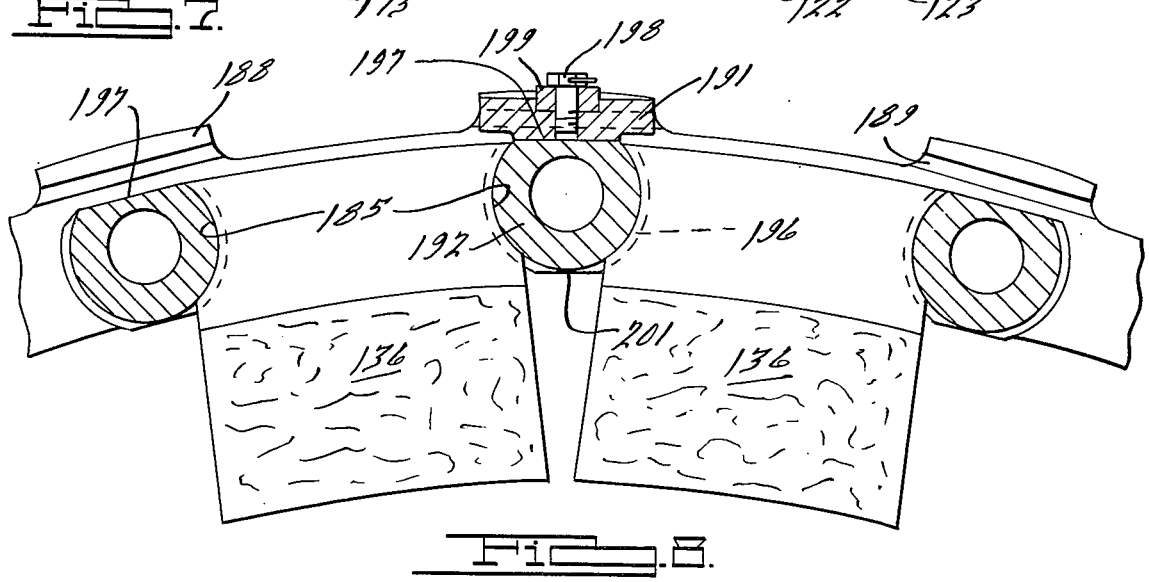
FIG. 8 is a cross-sectional view taken along the line 8—8 of FIG. 7 and showing the means for removably supporting the clutch disc segments.

The series of segmented clutch discs 137 are mounted in such a manner as to permit the easy removal of replacement of individual segments without the necessity of disassembling the entire mechanism. This means comprises recessed portions 185 on the opposite edges of each clutch disc segment 137 which interfit with bushings 192. These bushings have shoulders 196 which engage the sides of the clutch disc segments. The spacing between shoulders 196 at the opposite ends of the bushings 192 will allow slight axial play of the clutch disc as seen in FIG. 7. The upper surfaces 197 of bushings 192 are flat so as to be engageable by keys 191 and the portions 201 of shoulders 196 opposite surfaces 197 are also flat.

Keys 191 are slidable into enlarged portions 188 on rings 186 and 187 which surround the clutch discs, these enlarged portions having slots 189 to receive members 191. Each pair of rings 186 and 187 is connected by bridges 182 between sets of clutch disc segments. These are thus a plurality of integral members in tandem, each comprising a ring 186, a ring 187, and connecting bridges 182. The facing rings 186 and 187 between adjacent integral members clamp bushings 192 between them. The clamping is accomplished by studs 193 with nuts 194 and 195, the nuts being disposed between bridges 182. The studs at the ends of the stack are secured to members 181 and 183 as seen in FIG. 5. Members 191 are also held between these rings and are further secured against circumferential movement by locking bolts 198 passing through members 199 which are secured to rings 186 or 187 and threaded into members 191.

It will thus be seen that removal and replacement of any one or more of clutch disc segments 137 may be easily affected without the necessity of disassembling the entire unit. It will merely be necessary to unscrew the desired bolts 198, slip out members 191 from the raised portions 188 of rings 186 and 187 and rotate members 192 on their own axes until flat portions 197 and 201 face one another, i.e., are opposite the recessed portions 185 of the clutch disc segments 137. One may then slip out the clutch disc segment(s) since lips 196 will no longer be blocking such removal. After the new clutch disc segment(s) are inserted, members 192 may be rotated to their original position so that their lips 196 hold the new clutch segment(s) in place and members 191 slipped into position and held in place by bolts 198.

In operation of the entire system, the input signal to solenoid 31 of servo control valve 20 will cause this valve to control the signal to first stage fluid amplifier 21. This in turn will control the signal to second stage fluid amplifier 22, thus determining the flow rate and fluid pressure of both the main and auxiliary supplies to clutch 11. The main fluid supply will be fed to chambers 149 of piston and cylinder means 138, 141 of all the clutch assemblies 125. Thus, clutch plates 133 and 145 will approach the clutch disc segments 137 disposed between them to a greater or lesser extent depending upon the pressure supplied to chambers 149. Since the pressure is simultaneously applied in parallel to all chambers 149, the separate piston and cylinder means for each set of clutch disc segments and clutch plates will impose full force on all portions of the assembly, permitting the transmission of maximum torque.

At the same time fluid will be flowing through the auxiliary passages and out through passages 180 to the space 159 adjacent the clutch disc segments, while the main fluid supply will pass through orifices 158 to maintain the cooling effect on the clutch disc segments.

Since the auxiliary oil supply maintains a pressure in chambers 141 in accordance with the rotational speed of the unit (magnitude of the centrifugal force acting on the oil) the piston and cylinder means will be caused to positively retract, separating clutch plates 133 and 145 from the clutch disc segments and reducing to a minimum the residual drag.

It will be seen from the foregoing that the present invention provides a new and improved clutch unit which has a number of extremely important features not shown in the prior art. Among the more important of these features is highly improved cooling through better oil flow control, and a minimum amount of disc friction on the disc stack which provides for improved torque control. Another extremely important feature of the present invention is the segmental disc arrangement which minimizes the deleterious effects of heat on the discs. Additionally, convenient inspections of the disc segments is achieved without requiring total "teardown" of the unit. Another feature of the present invention resides in the fact that retraction of the discs is achieved via the centrifugal force of the oil which obviates the need for retraction springs which might tend to malfunction in clutch units of the size and speed range of the applicant's invention. More importantly, however, the present invention provides a new and improved clutch unit which minimizes residual drag which is extremely important in clutch units of the capacity, i.e., 85,00 h.p., of the present invention.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A clutch unit comprising an input shaft, an output shaft, a plurality of clutch plate elements connected to one of said shafts, a plurality of clutch disc elements interleaved betwen said clutch plate elements and connected to the other shaft, and separate means for closing the gap between each clutch disc element and its adjacent clutch plate element, said means comprising piston and cylinder means associated with one of said plurality of clutch plate elements and clutch disc elements, and fluid pressure control means for simultaneously supplying pressurized fluid in parallel to all of said piston and cylinder means.

2. A clutch unit according to claim 1, further provided with auxiliary fluid flow system means for said piston and cylinder means acting in a direction opposite to said first-mentioned fluid pressure control means for urging said clutch plate elements to retract from said clutch disc elements.

3. A clutch unit according to claim 2, further provided with passageway means for diverting fluid to the vicinity of the clutch disc elements for cooling purposes.

4. A clutch unit according to claim 2, further provided with passageway means leading from said auxiliary fluid flow system means to the vicinity of an adjacent clutch disc element for cooling purposes.

5. A clutch unit according to claim 1, said piston and cylinder means comprising a cylinder secured to one clutch plate element adjacent the clutch disc element and a piston secured to the other clutch plate element, said fluid pressure control means comprising main flow passageway means conducting pressurized fluid to one side of the piston so as to cause said clutch plate element to engage said clutch disc element.

6. A clutch unit according to claim 1, each of said clutch disc elements comprising a plurality of circumferentially arranged clutch disc segments, and means for supporting said clutch disc segments for removal independently of each other.

7. A clutch unit according to claim 1, said one shaft having an axially extending portion carrying a plurality of said clutch plate elements, said fluid pressure control means including passageway means through said axially extending portion of said one shaft.

8. A clutch unit according to claim 7, said axially extending portion of the one shaft having a plurality of axially extending passages, some of said passages being for main fluid pressure flow and alternate passages being for auxiliary fluid system flow, a chamber carried by said one shaft, means supplying auxiliary fluid flow to said chamber, and radial passages leading from said chamber to said alternate axial passages.

9. A clutch unit according to claim 1, said fluid pressure control means comprising a servo control valve, a first stage fluid amplifier connected to the output of said servo control valve, and a second stage fluid amplifier connected to the output of said first stage fluid amplifier, said piston and cylinder means being conected to the output of said second stage fluid amplifier.

10. A clutch unit according to claim 9, further provided with a reservoir and three separate pump means between said reservoir and said servo control valve, said first stage fluid amplifier and said second stage fluid amplifier.

11. A clutch unit comprising an input shaft, an output shaft, a plurality of clutch plates connected to one of said shafts, a plurality of clutch discs interleaved between said clutch plates and connectd to the other shaft, means for decreasing the gap between the clutch discs and the clutch plates, said decreasing means including fluid pressure control means for applying fluid pressure to said decreasing means, means for increasing the gap between said clutch discs and clutch plates, and centrifugal fluid pumping passage means for supplying fluid under pressure exerted by the centrifugal forced produced by rotation of the unit to said increasing means whereby said increasing means are operative to increase the gap between said clutch discs and said clutch plates in response to release of fluid pressure on said decreasing means.

12. A clutch unit comprising an input shaft, an output shaft, a plurality of clutch plate elements connected to one of said shafts, a plurality of clutch disc elements interleaved between said clutch plate elements and connected to the other shaft, actuating means for moving said clutch plate elements and said clutch disc elements into torque transmitting relationship, and fluid pressure control means for controlling said actuating means, said fluid pressure control means including servo control valve means and fluid amplifier means, said fluid amplifier means include a first stage fluid amplifier connected to the output of said servo control valve and a second stage fluid amplifier connected to the output of said first stage fluid amplifier, said servo control valve means being operative to control the output of said fluid amplifier means, the output of said second stage fluid amplifier being connected to said actuating means so as to control operation thereof.

13. A clutch unit comprising an input shaft, an output shaft, a plurality of clutch plate elements connected to one of said shafts, a plurality of clutch disc elements interleaved between said clutch plate elements and connected to the other shaft, said disc elements and said plate elements defining gaps therebetween, primary fluid flow paths for supplying fluid to said gaps for cooling and lubricating said disc elements and said plate elements and auxiliary fluid flow paths for supplying fluid to said gaps independently of said primary fluid flow path, said auxiliary fluid flow paths being operative to supply fluid to said gaps during both operation and disengagement of said clutch.

14. A clutch unit according to claim 13 wherein each of said plurality of disc elements and associated clutch plate elements has a primary fluid flow path and auxiliary fluid flow path associated therewith.

* * * * *